No. 689,551. Patented Dec. 24, 1901.
A. L. KULL.
WHEEL FOR MOTOR VEHICLES.
(Application filed May 4, 1901.)
(No Model.)

Witnesses
Wilhelm Vogt
Thomas M. Smith.

Inventor
Albert L. Kull,
by J. Walter Douglas
Attorney

UNITED STATES PATENT OFFICE.

ALBERT L. KULL, OF CAMDEN, NEW JERSEY.

WHEEL FOR MOTOR-VEHICLES.

SPECIFICATION forming part of Letters Patent No. 689,551, dated December 24, 1901.

Application filed May 4, 1901. Serial No. 58,718. (No model.)

*To all whom it may concern:*

Be it known that I, ALBERT L. KULL, a citizen of the United States, residing at the city of Camden, in the county of Camden and State of New Jersey, have invented certain new and useful Improvements in Wheels for Motor-Driven Vehicles, of which the following is a specification.

My invention has relation to improvements in wheels for motor-driven vehicles, and in such connection it relates to the construction and arrangement thereof.

The principal object of my invention is to provide a simple and efficient attachment to the hub of an ordinary wheel whereby the same is especially adapted for motor-driven vehicles.

The nature and scope of my invention will be more fully understood from the following description, taken in connection with the accompanying drawings, forming part hereof, on which—

Figure 1:
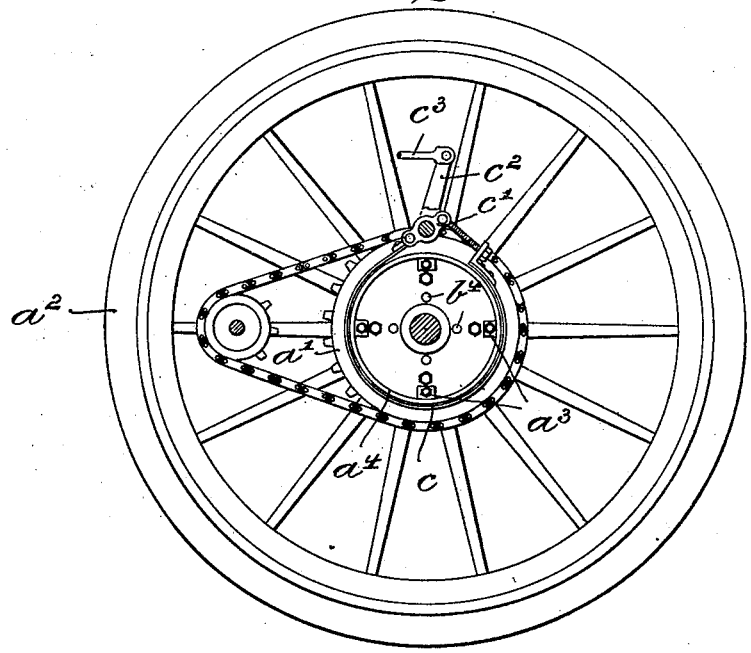
Figure 2:
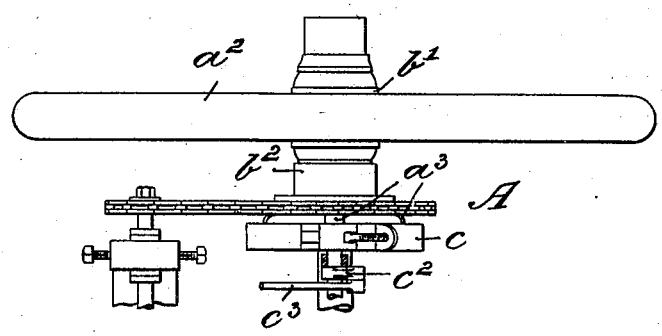
Figure 3:
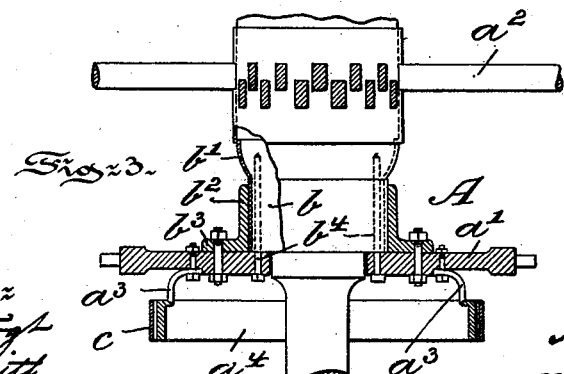

Figure 1 is a side elevational view partly in section, of a wheel for a motor-driven vehicle embodying features of my present invention. Fig. 2 is a top or plan view of Fig. 1; and Fig. 3 is a horizontal sectional view, enlarged, of the hub and attachment therefor.

Referring to the drawings, A represents means of my present invention for securing the sprocket-wheel $a'$ to the hub of the wheel $a^2$ of a motor or other similar vehicle. (Not shown.) The hub $b$ of the wheel is of the ordinary wooden type and is provided on its inner end with a metal cap $b'$. Upon this cap $b'$ is shrunk a flanged collar $b^2$, the flange $b^3$ of which projects at right angles to the main body of the collar $b^2$. To the inside face of the flange $b^3$ this collar $b^2$ is bolted or otherwise directly secured and to the sprocket-wheel $a'$, and for greater security this wheel $a'$ may be also pinned or screwed directly to the wood of the hub $b$ by means of long pins or screws $b^4$. On the inner face of the sprocket-wheel $a$ is bolted or otherwise secured a series of angular arms $a^3$, carrying the ring $a^4$, which is surrounded and adapted to be engaged by a brake-band $c$. This band may be operated by means of a link $c'$, controlled through the arm $c^2$ and rod $c^3$ in any preferred manner.

The parts of the wheel thus described are simple and may readily be secured to the wooden hub of an ordinary wheel.

A serious item of expense in the construction of automobiles or similar motor-vehicles has been incurred through the necessity to provide special driving-wheels for the vehicle. By the foregoing improvement any ordinary wheel may be readily adapted for the purposes explained and at but a slight cost.

Having thus described the nature and object of my invention, what I claim as new, and desire to secure by Letters Patent, is—

1. The combination with a wheel having a wooden hub, of a metal cap surrounding the external end of said hub, a metallic collar shrunk or otherwise fastened to said cap and provided with a flange projecting at right angles to the axis of the hub and a sprocket-wheel having its body arranged parallel with and fastened to said flange, substantially as and for the purposes described.

2. The combination with a wheel having a wooden hub, the external end of which is surrounded by a metal cap, of a metal collar shrunk or otherwise fastened to said cap and having a flange projecting at right angles to the axis of the hub, a sprocket-wheel having its body arranged parallel with and fastened to said flange, and means for fastening the body of said sprocket-wheel directly to the wooden hub, substantially as and for the purposes described.

3. A wheel for a motor-driven vehicle provided with a wooden hub, a metal cap secured to said hub, a flanged collar secured to said cap, a sprocket-wheel fastened to the flange of said collar and to said hub, a ring fastened to said sprocket-wheel and a brake-band adapted to encircle said ring, substantially as and for the purposes described.

4. A wheel for a motor-driven vehicle provided with a wooden hub, a metal cap connected with said hub, a flanged collar secured to said cap, a sprocket-wheel fastened to the flange of said collar and to said hub, a ring fastened to said sprocket-wheel, a brake-band adapted to encircle said ring, and means adapted to actuate said brake-band to engage said band with said ring, substantially as and for the purposes described.

In testimony whereof I have hereunto set my signature in the presence of two subscribing witnesses.

ALBERT L. KULL.

Witnesses:
J. WALTER DOUGLASS,
THOMAS M. SMITH.